United States Patent
Klocke

(10) Patent No.: US 6,848,328 B2
(45) Date of Patent: Feb. 1, 2005

(54) POSITIONING UNIT AND POSITIONING APPARATUS WITH AT LEAST TWO POSITIONING UNITS

(75) Inventor: Volker Klocke, Stolberg-Breinig (DE)

(73) Assignee: Klocke Nanotechnik, Aachen (DE)

( * ) Notice: Subject to any disclaimer, the term of this patent is extended or adjusted under 35 U.S.C. 154(b) by 0 days.

(21) Appl. No.: 10/094,939

(22) Filed: Mar. 11, 2002

(65) Prior Publication Data

US 2002/0166398 A1 Nov. 14, 2002

Related U.S. Application Data

(60) Provisional application No. 60/274,824, filed on Mar. 9, 2001.

(30) Foreign Application Priority Data

Mar. 9, 2001 (EP) .............................. 01105954

(51) Int. Cl.⁷ .............................. B25J 7/00; F16H 21/44
(52) U.S. Cl. ........................ 74/110; 310/307; 310/309; 310/310; 977/DIG. 1
(58) Field of Search ........................... 74/110; 310/307, 310/309, 310, 311, 328, 323

(56) References Cited

U.S. PATENT DOCUMENTS

| | | | |
|---|---|---|---|
| 5,179,499 A | * | 1/1993 | MacDonald et al. ........ 361/313 |
| 5,223,713 A | | 6/1993 | Uozumi et al. |
| 5,229,679 A | * | 7/1993 | Higuchi et al. ............ 310/328 |
| 5,319,257 A | * | 6/1994 | McIntyre .................... 310/328 |
| 5,536,988 A | * | 7/1996 | Zhang et al. ............... 310/309 |
| 5,629,577 A | * | 5/1997 | Polla et al. ................. 310/328 |
| 6,461,337 B1 | * | 10/2002 | Minotti et al. ............. 310/309 |
| 6,556,028 B1 | * | 4/2003 | Umanskiy et al. ......... 324/727 |

FOREIGN PATENT DOCUMENTS

| | | |
|---|---|---|
| DE | 38 44 821 C2 | 11/1990 |
| DE | 44 40 758 A1 | 5/1996 |
| DE | 197 44 126 A1 | 4/1999 |
| DE | 199 16 277 A1 | 10/2000 |
| EP | 0 611 485 B1 | 4/1996 |
| EP | 0 935 137 A1 | 8/1999 |
| FR | 933 509 | 4/1948 |
| GB | 1 501 253 | 2/1978 |
| WO | WO 00/77553 A1 | 12/2000 |

OTHER PUBLICATIONS

Karidis, J. P., et al., The Hummingbird Minipositioner—Providing Three–Axis Motion at 50G's with Low Reactions, May 1992, 1992 IEEE International Conference on Robitics and Automation, entire article.*

* cited by examiner

Primary Examiner—David A. Bucci
Assistant Examiner—Timothy McAnulty
(74) Attorney, Agent, or Firm—Henry M. Feiereisen; Ursula B. Day

(57) ABSTRACT

A positioning unit (1) includes an accelerating nanodrive (2), which has a resolution of at least ±10 nm, a slider (5) and a module (6, 7), which has a stationary component (6) and a component (7) movable for this purpose. The component (7) has a mass of less than 500 g and is movably supported relative to the drive (2). The slider (5) and the movable component (7) of the module (6, 7) are securely connected one to the other and the drive (2) can exert accelerations higher than 10 G.

12 Claims, 3 Drawing Sheets

POSITIONING UNIT AND POSITIONING APPARATUS WITH AT LEAST TWO POSITIONING UNITS

CROSS-REFERENCES TO RELATED APPLICATIONS

This application claims the benefit of prior filed provisional application, Appl. No. 60/274,824, filed Mar. 9, 2001, pursuant to 35 U.S.C. 119(e), the subject matter of which is incorporated herein by reference.

This application claims the priority of European Patent Application, Serial No. 01 105954.0, filed Mar. 9, 2001, pursuant to 35 U.S.C. 119(a)–(d), the subject matter of which is incorporated herein by reference.

BACKGROUND OF THE INVENTION

The present invention relates to a positioning unit with an accelerating nanodrive, which has a resolution of at least ±10 nm, a slider and a module which has a stationary component and a component movable for this purpose, which has a mass of less than 500 g and is movably supported relative to the drive. The invention also relates to a positioning apparatus with at least two such positioning units.

Such positioning units are used, for example, to move the object observed under a microscope. Here it is important that the drive makes for a preset position with an especially high resolution. This is achieved by the drive exerting acceleration on a slider and thereby moving the slider relative to the drive.

As a rule, high resolution is achieved by repeatedly moving the slider merely a particularly short distance. This distance lies in the nanometer range and the slider can be positioned with extremely high resolution by means of a plurality of such small movement steps.

In these nanodrives a distinction is made between clamping and accelerating methods. In clamping methods the slider is gripped, moved a short distance and then released again. The clamps quickly return to the initial position and grip the slider again to achieve another forward push again in the nanometer range.

The other group of nanodrives uses relatively high accelerations, which are generally higher than 10 G, as the drive principle. These can be inertial drives or drives which accelerate their movable component, that is the slider, by means of mechanical pulse waves. This group of nanodrives generally has a simpler structure and can therefore be designed as a smaller structural unit. Particularly compact forms of such nanodrives are described in DE 38 44 821 C2, EP 0 611 485 B1 and DE 44 40 758 A. This type of nanodrive will subsequently be called an accelerating nanodrive.

There is great interest in using said compact accelerating nanodrives for positioning the movable components of a module which has a mass of less than 500 g and is supported relative to the drive. However, it has been found that the accelerating nanodrive is not suitable for this purpose.

If such modules are brought in contact with an accelerating nanodrive, even if the components are correctly designed, no technically usable force transmission between the accelerating nanodrive and the movable component of the module is achieved. Even if the accelerating nanodrive can exert many times the force which would be required to accelerate the movable component of the module, the accelerating nanodrive is braked as soon as it comes in contact with the movable component of the guide module. Precision engineers using nanodrives had first tested the interaction of drive and module in a loose structure, as is usually the case when using these actuating drives, before they securely connected the units one to the other. In these tests the accelerating drives were generally inferior to the clamping drives and thus only clamping drives were used for generic positioning units. This led the practical workers to recognize that accelerating drives with nanometer precision are not suitable for positioning modules having a mass of less than 500 g.

All attempts to use such an accelerating nanodrive for positioning such a light movable component of the module have failed in that enlarging the drive initially met with no success and from a certain size of drive, preference was given to drives using clamping movement.

It would therefore be desirable and advantageous to provide an improved positioning unit which obviates prior art shortcomings and allows use of accelerating nanodrives.

SUMMARY OF THE INVENTION

According to one aspect of the present invention, a positioning unit with an accelerating nanodrive, which has a resolution of at least ±10 nm, a slider and a module, which has a stationary component and a component movable for this purpose, which has a mass of less than 500 g and is movably supported relative to the drive, wherein the slider and the movable component of the module are securely connected one to the other and the drive can exert accelerations higher than 10 G.

Surprisingly it has been found that when the slider and the movable component of the module are securely connected, the entire performance capacity of the drive can be utilized although tests using accelerating drives where the drive was held onto the movable component of the module resulted in failure.

Precision engineers using nanodrives had first tested the interaction of drive and module in a loose structure, as is usually the case when using these actuating drives, before they securely connected the units one to the other. In these tests the accelerating drives were generally inferior to the clamping drives and thus only clamping drives were used for generic positioning units. This led the practical workers to recognize that accelerating drives with nanometer precision are not suitable for positioning movable module components having a mass of less than 500 g.

Contrary to this knowledge, sliders and movable component of the module according to the invention were securely connected one to the other although preliminary tests using loose arrangements had failed.

The invention thus makes it possible to achieve an especially compact construction of positioning units by using accelerating nanodrives having particularly compact structures.

Particularly advantageous in practice is the use of drives which allow a positioning distance of more than 1 mm. In this way, simple adjustment positioning is achieved in a larger field of movement.

For many technical applications it is advantageous if the drive has a resolution of at least ±1 nm. A resolution exceeding 1 nm allows the units to be used in a wide range of applications in micro-adjustment technology.

In order to achieve an efficient drive, it is proposed that the drive can exert accelerations greater than 20 G, preferably greater than 40 G, on the slider. In a preferred embodiment the accelerations are below 500 G, preferably below 200 G, typically in a range between 50 and 100 G. As a rule, the acceleration plotted over time forms a saw-tooth line. However, the acceleration can also be applied to the slider with gentler curve profiles, such as rounded arcs of curves, for example.

The acceleration applied to the slider according to the invention is above 10 G to delimit against quasi-static clamping movement.

The modules can be supported using balls, rollers or needles. Supporting via sliding surfaces, airflow or magnetic, electric or electromagnetic fields is also possible. The module has one or several very easily movable component(s) supported on one or several stationary component(s) relative to a reference system. Here it is advantageous if the module is movably supported with respect to several degrees of freedom. This allows, for example, several drives to act on the movable component of the module to bring the module into a desired spatial position with higher resolution.

A compact, small structure can be achieved particularly if the movable component of the module has a mass of less than 100 g. In practice, it has been found that functional units particularly having modules with a mass higher than 0.2 g should be constructed.

A wide range of types of connection are suitable as the secure connection, such as sticking, soldering, welding, screwing, clamping or joining. Also detachable secure connections such as, for example, magnetic connections, are included in the types of connection proposed according to the invention.

It is advantageous if the secure connection is substantially free from play and damping. This increases the security of the force transmission from the drive to the module.

The object of the invention is also achieved using a positioning apparatus with at least two positioning units according to the invention, which are securely connected to the movable component of the module. By using several positioning units it is possible to construct an xy table, an xyz stand, a tilting table, a goniometer, a rotating element, a portal system or a robot. Here the positioning units can be used as laterally or rotationally acting drives.

It is to be understood that the secure connection between the slider and the movable component of the module can be achieved by a direct connection between the slider and the movable component of the module and that an intermediate element or a hinge, which is securely connected to the slider and the movable component of the module, can be placed between the slider and the movable component of the module. Here drives and modules can be arranged side by side or one behind the other or partly side by side and partly one behind the other.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
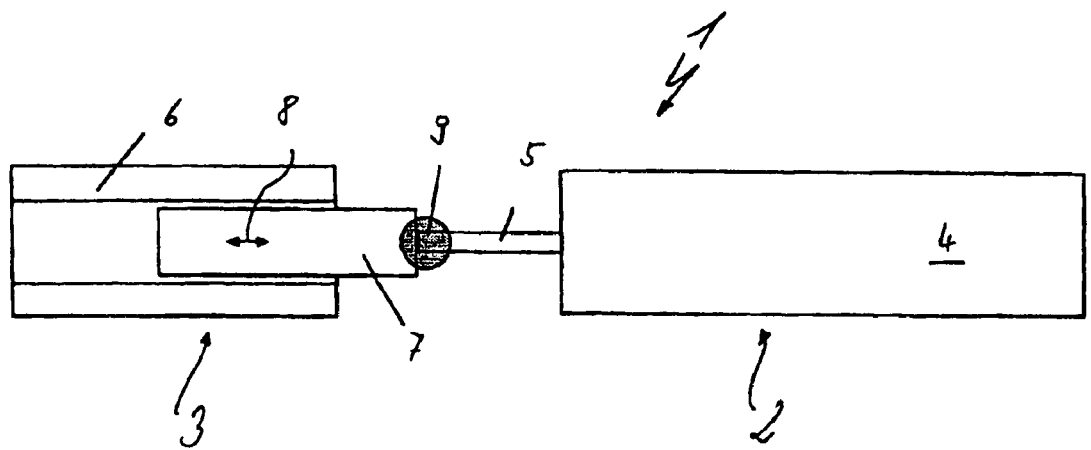
FIG. 1 is a schematic diagram showing the interaction of an accelerating nanodrive with a linear guide module.

The positioning unit 1 in FIG. 1 has a drive 2 and the guide module 3. The drive is designed so that in the event of mere contact between the drive and the movable component, it is not possible to have any technically usable force transmission between the drive and the movable component of the module. The drive 2 substantially consists of the actuator 4 and the slider 5. The guide module 3 consists of the stationary component 6 and the component 7 movable for this purpose. In the present case, the movable component 7 can be displaced along a straight line in accordance with the arrows 8 relative to the stationary component 6. The movable component 7 of the guide module 3 is connected via a secure connection—as in the present case, a weld seam—to the slider 5 of the nanodrive 2.

Although no technically usable force transmission can be achieved if the nanodrive 2 and the movable component 6 of the guide module 3 are loosely connected, merely by introducing the secure connection 9, the structure allows the movement drive to be used in connection with such a module.

Figure 2:
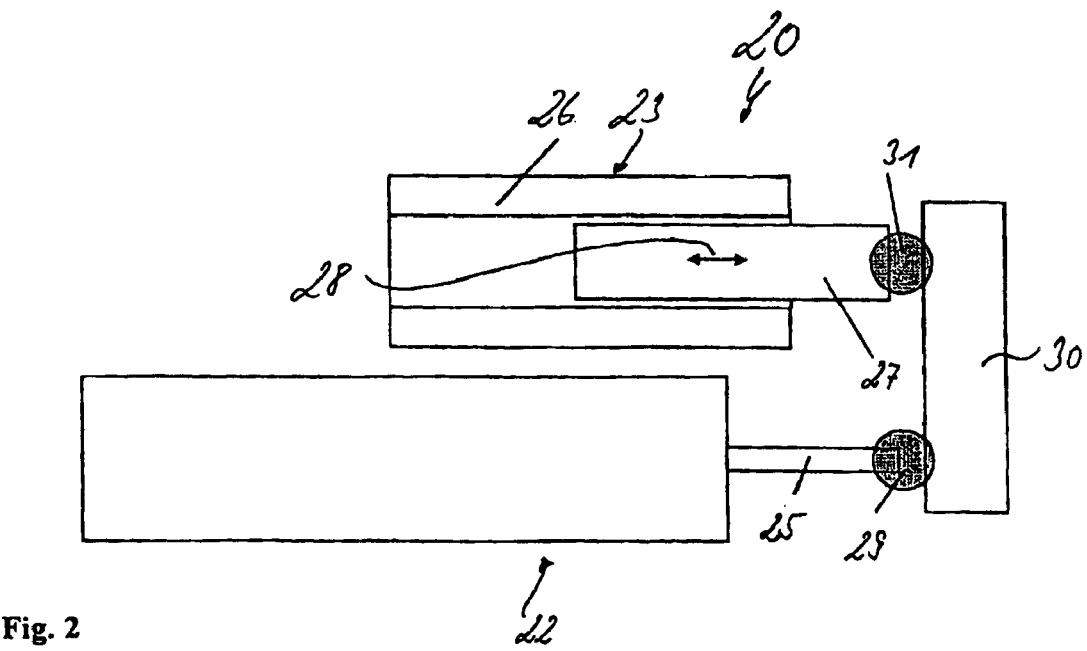
FIG. 2 is a schematic diagram showing the interaction of an accelerating nanodrive with a linear guide module, which are coupled via a connecting element.

Another embodiment is shown in FIG. 2. In this arrangement 20, the slider 25 of the drive 22 acts on a first secure connection 29 which connects the slider 25 with a connecting element 30. The connecting element 30 is connected via another connection 31 to the movable component 27 of the guide module 23. This allows the guide module and the drive to be arranged one next to the other.

When the slider 25 moves, the movable component 27 of the guide module 23 is moved relative to the stationary component 26 in the direction of the arrow 28 via the connecting element 30.

Figure 3:
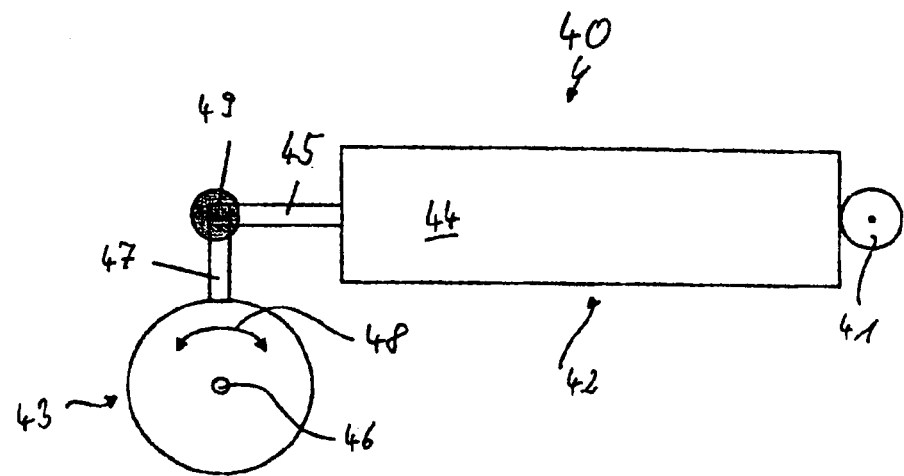
FIG. 3 is a schematic diagram showing the interaction of an accelerating nanodrive with a linear guide module with an inserted hinge element.

Another example of embodiment of the positioning unit according to the invention is shown in FIG. 3. In this arrangement 40 the slider 45 of the drive 42 acts on the movable component 47 of a stationary axis of rotation 46 of the hinge joint 43. The connection between the slider 45 and the movable component 47 of the hinge joint 43 is in the present case a hinge joint 49 which allows any angular position between the slider 45 and the movable component 47 but ensures that these parts are securely connected. The drive 42 is attached to the bearing 41 such that it can be rotated.

When the slider 45 moves relative to the actuator 44 of the drive 42, the movable component 47 of the hinge joint 43 is thus turned about the axis of rotation 46 in accordance with the arrow 48.

Figure 4:
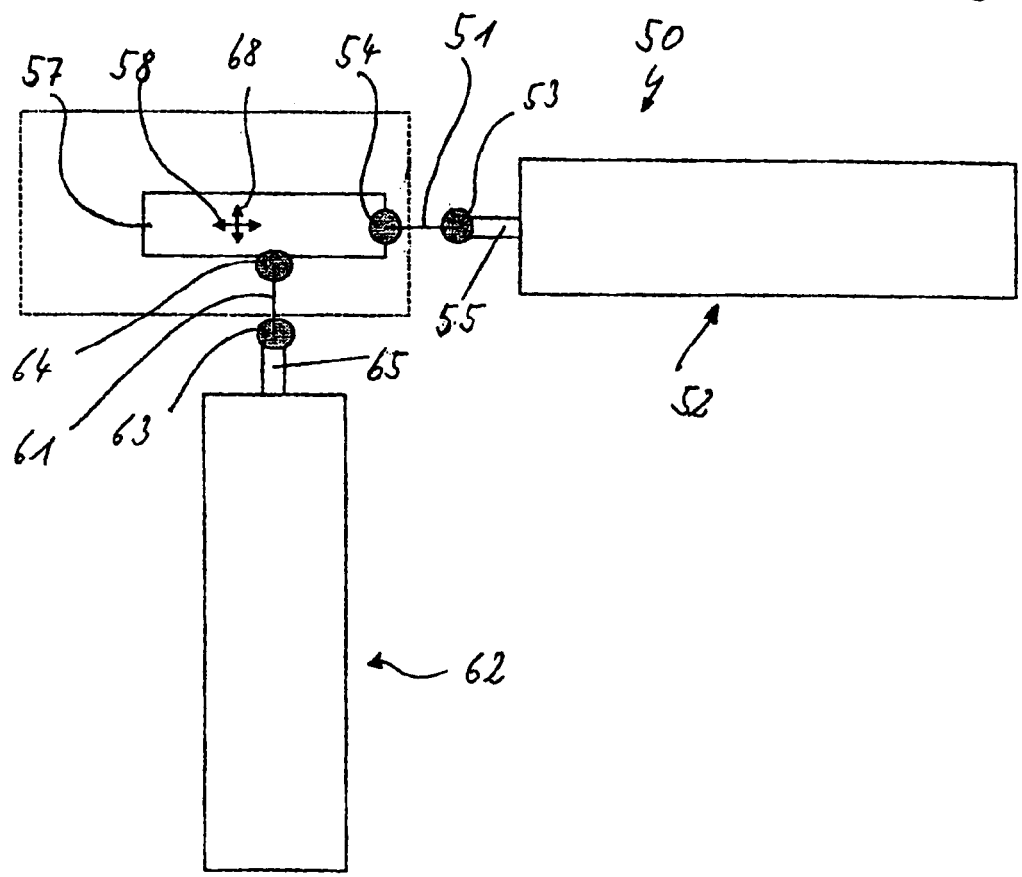
FIG. 4 is a schematic diagram showing the interaction of two accelerating nanodrives with a guide module constructed as an xy table.

FIG. 4 shows the use of a positioning unit according to the invention for an xy table as configuration 50. The drives 52 and 62 with their respective sliders 55 or 65 each act on a respective connecting element 51 or 61. These connecting elements 51 or 61 are arranged substantially orthogonal one to the other and are connected to the movable component 57 of the xy table 58. In order to allow the movable component 57 to move both in the direction of the arrow 58 and also in the direction of the perpendicularly arranged arrow 68, the connections 51 and 61 are constructed as an at least slightly laterally flexible element. These connecting elements 51 or 61 can be constructed as simple wire, flat springs or as a complex mechanical hinge with bearings and counterbearings. The movable component 57 is connected to the xy table via an air support, an electrical or an electromagnetic support.

In accordance with the examples of embodiment described previously, it is also important in the present case that both between the sliders 55 or 56 and the connecting elements 51 or 61, and also between the connecting elements 51 or 61 and the movable component 57 of the xy table 58 there are provided secure connections 53 or 54 and 63 or 64.

Figure 5:
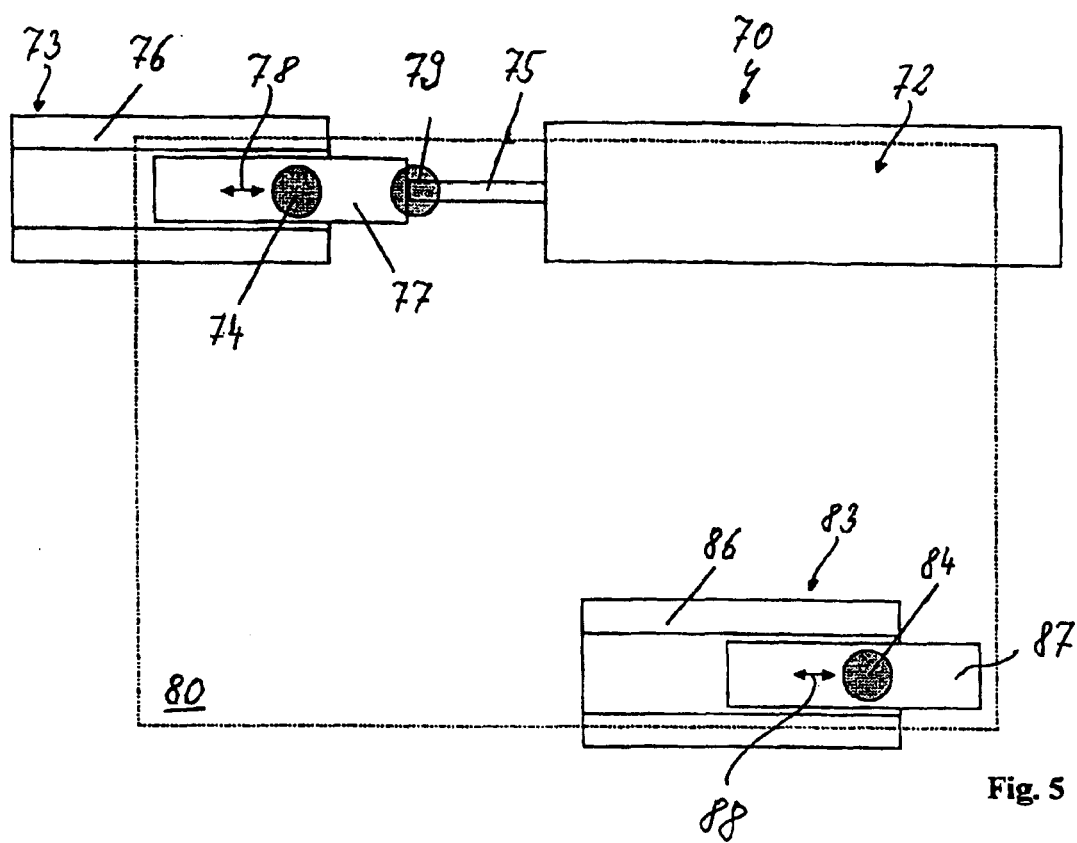
FIG. 5 is a schematic diagram showing the interaction of an accelerating nanodrive with two linear guide modules.

The example of embodiment 70 shown in FIG. 5 shows a first guide module 73 which is arranged in a row in front of the accelerating nanodrive 72 and a second guide module 83 that is arranged parallel and staggered relative to the first guide module 73. The slider 75 of the accelerating nanodrive 72 has a secure mechanical connection 79 to the movable component 77 of the guide module 73. The movable component 77 also has a secure mechanical connection 74 to a connecting element 80 which can, for example, be a cover plate or an open frame. This connecting element 80 has a secure mechanical connection 84 to the movable component 87 of the second guide module 83.

The movement of the slider 75 thus results in a movement of the connecting element 80 in the direction of the arrows 78 and 88 relative to the stationary component 76 of the guide module 73 or 86 of the guide module 83.

These examples of embodiment show that any combinations of one or several accelerating nanodrives and one or several linear, rotating or multi-axis guide modules can be produced.

While the invention has been illustrated and described as embodied in a positioning unit and positioning apparatus with at least two positioning units, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A positioning unit comprising:
   an accelerating nanodrive selected from the group consisting of an inertial drive and a pulse wave drive with a resolution of at least ±10 nm for exerting accelerations of more than 10 G to a slider; and
   a module having a stationary component and a component movable, relative thereto, said movable component having a mass of less than 500 g and movably mounted relative to one of the nanodrive or the pulse wave drive and the stationary component; wherein the slider and the movable component of the module are rigidly connected with each other.

2. The positioning unit according to claim 1, wherein the drive is capable of a positioning distance of more than 1 mm.

3. The positioning unit according to claim 1, wherein the drive is enabled for a positioning path of at least ±1 nm.

4. The positioning unit according to claim 1, wherein the drive can exert accelerations greater than 20 G.

5. The positioning unit according to claim 1, wherein the drive can exert accelerations of less than 500 G.

6. Positioning unit according to claim 1, characterized in that movable component at the module is movably supported with respect to several degrees of freedom.

7. The positioning unit according to claim 1, wherein the movable component of the module has a mass of less than 100 g.

8. The positioning unit according to claim 1, wherein the movable component of the module has a mass greater than 0.2 g.

9. The positioning unit according to claim 1, wherein the rigid connection is substantially free of play and damping.

10. Positioning apparatus with at least two positioning units according to claim 1, which is securely connected to the movable component of the module.

11. The positioning unit according to claim 4, wherein the accelerations are greater than 40 G.

12. The positioning unit according to claim 5, wherein the drive can exert accelerations of less than 200 G.

* * * * *